United States Patent [19]
Koenig

[11] 4,116,843
[45] Sep. 26, 1978

[54] LIQUID AND SOLIDS SEPARATOR

[75] Inventor: Ronald Dean Koenig, Fort Atkinson, Wis.

[73] Assignee: Hartel Corporation, Fort Atkinson, Wis.

[21] Appl. No.: 836,936

[22] Filed: Sep. 27, 1977

[51] Int. Cl.² .......................................... B01D 33/04
[52] U.S. Cl. ................................................. 210/391
[58] Field of Search ............................ 210/400–401, 210/391, 393, 396, 74, 194, 197, 196

[56] References Cited

U.S. PATENT DOCUMENTS

| | | | |
|---|---|---|---|
| 307,707 | 11/1884 | Byerley | 210/400 |
| 864,828 | 9/1907 | Callow | 210/391 |
| 2,087,775 | 7/1937 | Matthews | 210/194 |
| 2,619,232 | 11/1952 | Parsons et al. | 210/391 |
| 3,158,984 | 12/1964 | Butler | 210/400 |
| 3,485,377 | 12/1969 | McKenzie et al. | 210/400 |
| 3,537,584 | 11/1970 | MacDonald et al. | 210/196 |
| 3,950,562 | 4/1976 | Senior | 210/74 |

Primary Examiner—William A. Cuchlinski, Jr.
Assistant Examiner—Jon Hokanson
Attorney, Agent, or Firm—Wheeler, Morsell, House & Fuller

[57] ABSTRACT

A mixture of liquids and solids flowing at high velocity is discharged into a well which reduces its velocity. The mixture flows from the well over a dam and is deposited uniformly onto a moving porous woven filter belt which drains the liquid and transports the solids to a place where the solids fall from the belt or are scraped from it.

2 Claims, 5 Drawing Figures

Fig. 1

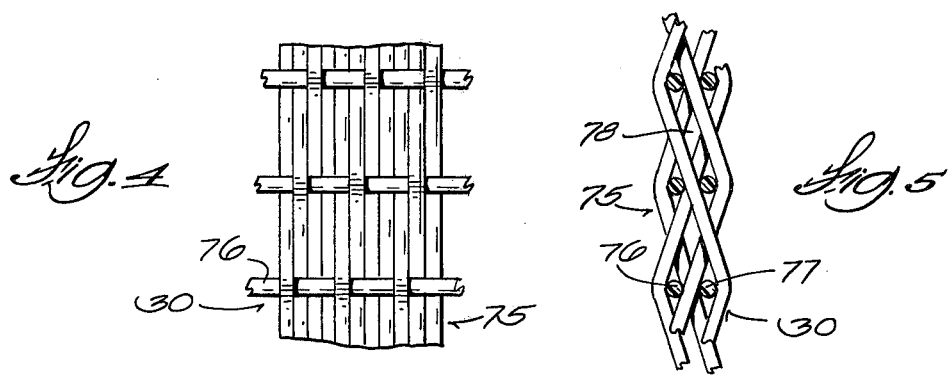
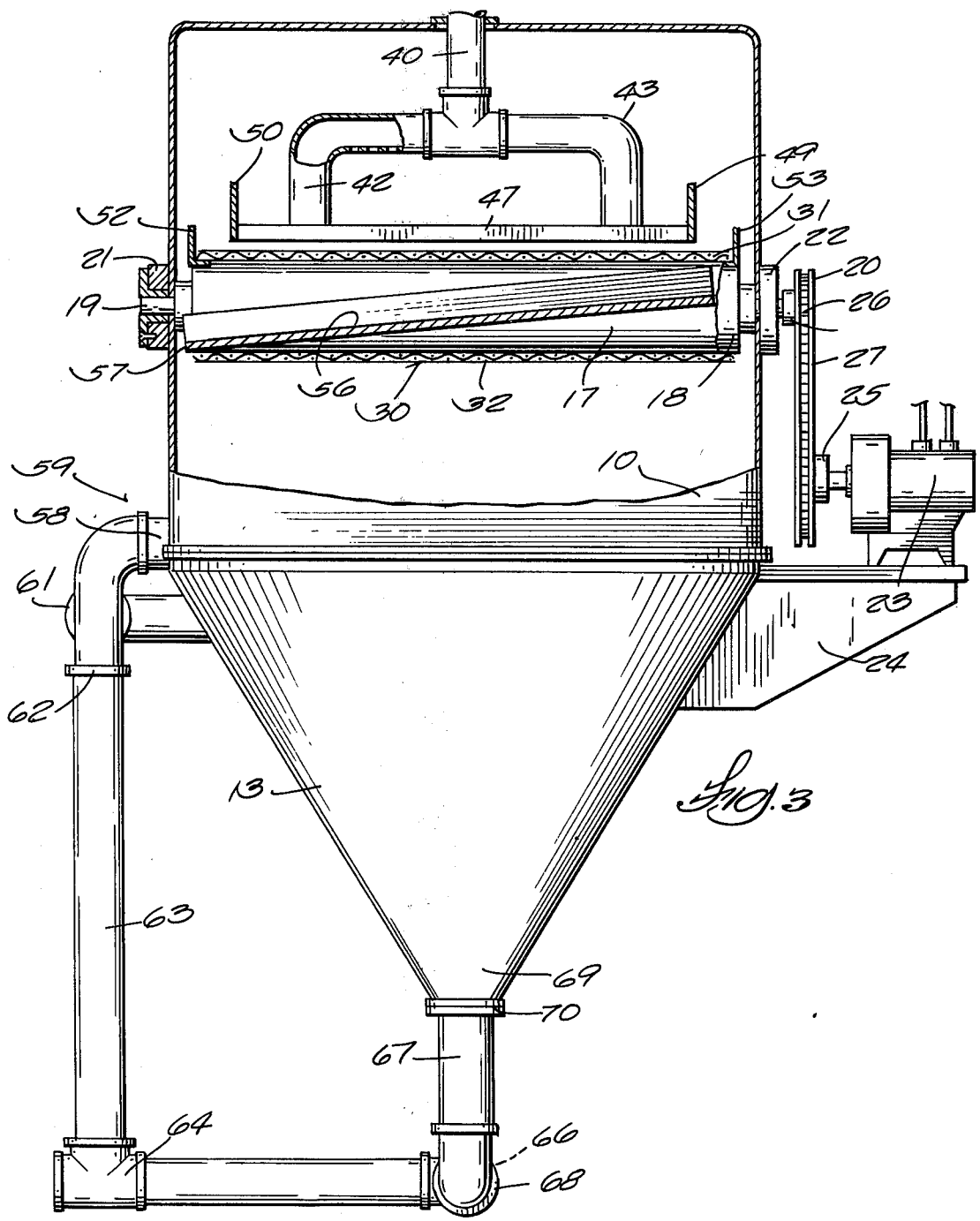

LIQUID AND SOLIDS SEPARATOR

BACKGROUND OF THE INVENTION

This invention relates to apparatus for separating liquids and solids. The apparatus is intended primarily for use in the food processing industry, such as in cheese making, for separating the curd from an aqueous slurry but it has other uses such as for separating cooking oil from batter and for drying rings made of reconstituted onions. The apparatus may be used in other industries too such as to drain excess water from sand and the like.

The new separator is especially proficient in separating liquid from a mixture of fine solids which tend to coagulate. Separating the water from a slurry of cheese constituents is a good example. This separating operation has been problematical. An ordinary pass-through porous filter mat does not work well because the pores soon plug and stop filtration. Large area screens or rather coarsely woven webs have been used for filtering. The slurry, which is to be separated into solids and fluid components, is flowed over a mesh such as that of a web or screen which is vibrated to enhance flow of fluid through the mesh while the solids remain on top of it. However, in actual production, the slurry is pumped from cheese making vats to the separator at flow rates which are faster than the mesh can relieve the mixture of its water. This results in the need for a surge tank and an extra pump to feed the separator from the tank at a slower rate. Another problem has been to get the slurry to distribute evenly, that is, in a layer of uniform thickness over the mesh. If the layer is too thick in some areas of the mesh, solid particles themselves compact and preclude filtering in those areas. The optimum condition is to have the slurry or other fluidized mixture flow over the mesh so that a layer of solids is formed which is thin enough to maintain its porosity and, thus, to have the solid particles act as a fine hole filter.

SUMMARY OF THE INVENTION

A general object of the present invention is to provide apparatus which separates liquid from solids on a continuous basis at high efficiency.

Another object is to use a porous translating belt as the filter or separator and to control flow velocity and distribution of the solid and liquid mixture over the belt such that the solids themselves contribute toward the filtering process and overloading and clogging is avoided.

Yet another object is to provide apparatus for separating liquids from solids which is easy to maintain in a sanitary state and is easy to operate.

Briefly stated, the new separator is characterized by using a porous filter belt which lies in a substantially horizontal plane and is translated continuously. The incoming fluidized mixture, which is to be separated into liquid and solid components, is supplied at high velocity and volume to a sump or well. At one side of the well there is a dam. Expanding of the fluidized mixture by dispensing it from a feed pipe to the well reduces its velocity. A spillway next to the dam spreads the mixture uniformly over the width of the filter belt. As the mixture is transported on the belt, the liquid filters through and is drained away from the belt. The solids reach the end of the belt and fall off or are scraped off.

As indicated earlier, the new separator is designed to dry or separate fluid from a variety of solids ranging from large to very fine particle size. The particles may be as large as potatoes or of an intermediate size such as sand grains or extremely fine such as in a cheese curd slurry. Any such slurries or wet particle mixtures, regardless of the particle size, will be referred to hereinafter as fluidized mixtures.

How the foregoing and other more specific objects of the invention are achieved will be apparent in the more detailed description of a preferred embodiment of the invention which will now be set forth in reference to the drawings.

DESCRIPTION OF THE DRAWINGS

FIG. 3 is an end elevation view looking at the right end of the separator in FIG. 1 with a part of the housing wall broken away to show the interior thereof, some of the interior parts being shown in section;

FIG. 4 is a plan view of a fragment of the filter belt; and

FIG. 5 is a view of an edge of said fragment.

DESCRIPTION OF A PREFERRED EMBODIMENT

Figure 1:
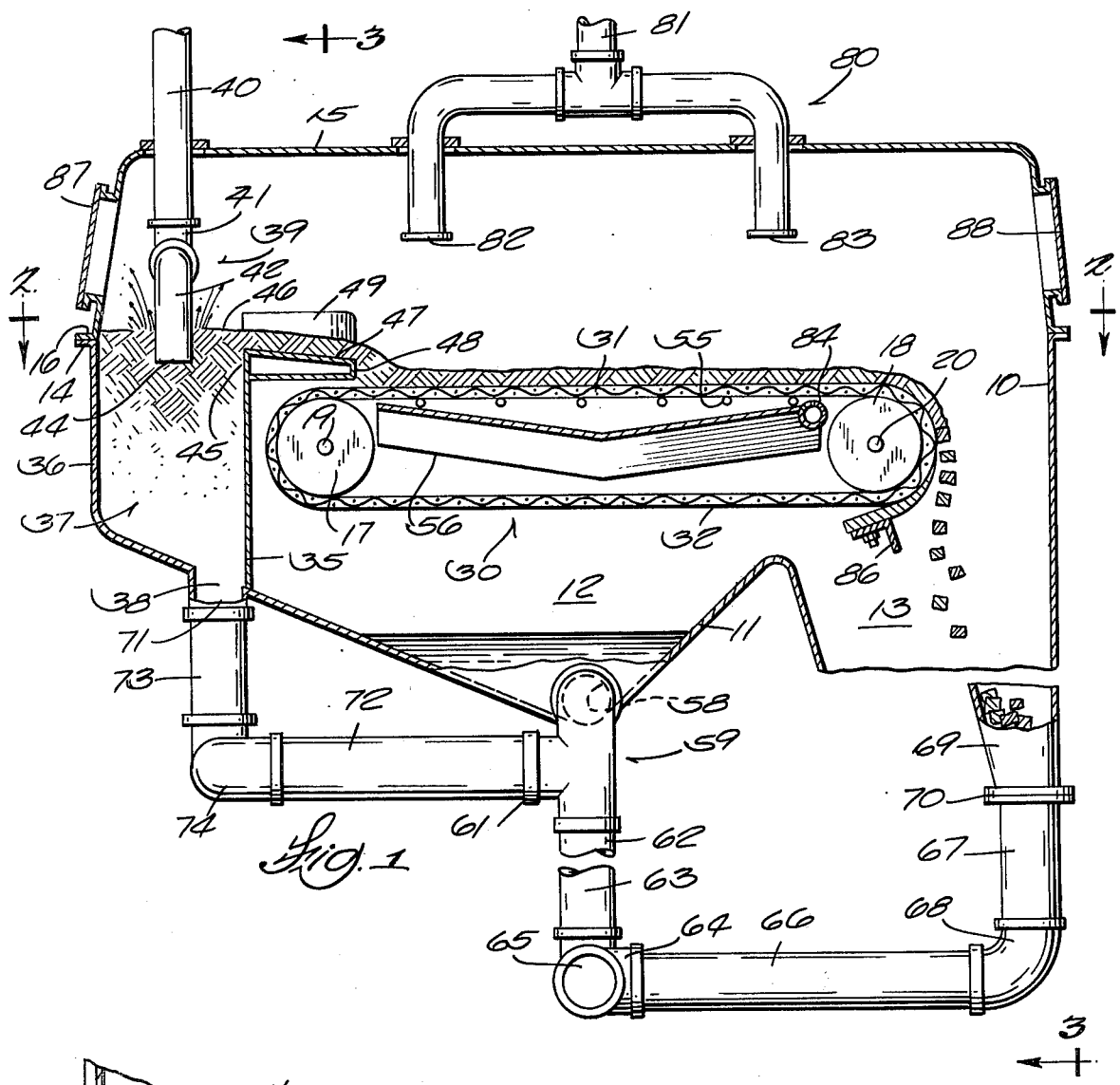
FIG. 1 is a vertical longitudinal section of the new separator.

The apparatus in FIG. 1 comprises a lower housing section 10 which is preferably made of non-corrosive metal such as T304 stainless steel. The bottom 11 of the housing is shaped to define two chambers 12 and 13. Fluids which are separated from the fluidized mixture are collected in chamber 12. The separated solids are collected in chamber 13. The upper margin of the lower housing section 10 has a flange 14 extending laterally from it. A cover or top section 15 has a corresponding flange 16 for supporting the cover or top section 15 on lower housing section 10. Conventional means for clamping the flanges 14 and 16 to effect a seal between upper housing section 15 and lower section 10 have been omitted.

A roller or idler pulley 17 and a driven pulley 18 are disposed in lower housing section 10 with their axes in parallelism and extending laterally across the interior of the housing. Pulley 17 has a shaft 19 and pulley 18 has a shaft 20. As can be seen in FIG. 3, shaft 19 of idler pulley 17, which is rearmost in this figure, is journaled in a bearing 21 which is on the outside of housing 10. A corresponding bearing for the other end of pulley 17 is not visible in this figure as it is behind bearing 22 which is the bearing for driven pulley 18 that is shown fragmentarily in FIG. 3.

Pulley 18 is driven by a variable speed air motor 23 which is mounted on a stand 24 that is fastened to the housing. The shaft of motor 23 has a roller chain sprocket 25 which is coupled to a similar sprocket 26 on filter belt pulley 18 by means of a roller chain 27.

A closed loop porous filter belt 30 runs over driven pulley 18 and idler pulley 17. The width of the filter belt is almost as great as the interior width of housing 10. The upper portion of the filter belt loop is marked 31 and its lower portion is marked 32. When motor 23 is energized, upper filter belt portion 31 is translated to the right as it appears in FIG. 1.

A plan view of a fragment of the filter belt 30 is shown in FIG. 4 and a side view is shown in FIG. 5. The filter belt used in a commercial embodiment of the new separator is woven from lengthwise extending polyethylene filaments 75 which cross over and under two layers of crosswise extending filaments 76 and 77. Thus, the belt is woven in a manner that permits fluids to flow in a tortuous path from the top surface to the bottom surface of the belt. Although fluid can pass through the pores, there is no direct line of sight between the surfaces of the belt when the belt is in view perpendicular to its plane. In a machine that is especially adapted for separating water and solids from a cheese slurry, the belt filaments are on the order of 1/64th of an inch in diameter and the total thickness of the belt is about 1/16th of an inch. The belt may be made of stainless steel filaments but for food processing applications, polyethylene is preferred because slivers that might fall from a degraded polyethylene belt would not be injurious.

FIG. 5 shows how off setting of lengthwise filaments 75 results in pores 78 being created under each long filament. These pores are open on their sides by an amount equal to the thickness of the crosswise filaments.

Referring to FIG. 1, there is a sheet metal wall 35 extending laterally across the interior of housing section 10. A portion 36 of the wall of housing 10 is bulged outwardly and spaced from interior lateral wall 35 so as to define a sump or well 37. The bottom 38 of the well 37 is at a substantial distance below the plane in which upper filter belt portion 31 runs.

A fluidized mixture such as a cheese curd slurry is fed into well 37 with a nozzle assembly that is generally designated by the reference number 39. The nozzle assembly is fed from a supply pipe 40 which is connected to a pump, not shown, whose inlet draws slurry from a vat which is also not shown. Typically, in the cheese making process, the fluidized mixture is delivered by the pump through the nozzle to well 37 at a flow rate of 250 gallons per minute. This means that the mixture must flow from the nozzle assembly at high velocity. As can be seen in FIGS. 1 and 3, the nozzle assembly includes a Tee 41 from which two right angularly bent tubes 42 and 43 extend. These tubes have open bottom ends, an illustrative one of which is marked 44 in FIG. 1. The downwardly extending portions of nozzle tubes 42 and 43 are each about halfway between the center of the well and its sides. The fluidized mixture is projected toward the bottom 38 of the well into which the mixture undergoes a volume increase which results in slowing of its flow velocity. There is, however, a continuous supply of the mixture so the well overflows. The top margin 45 of well wall 35 consitutes a dam over which the mixture overflows. Thus, the height or level of the top surface of mixture 46 is above that of the plane of upper filter belt portion 31.

A planar sloped spillway 47 is provided adjacent the dam or outlet region of well 37. As can be seen in FIG. 3, the spillway is about equal in width to the width of the filter belt. The spillway terminates at an edge 48 which is longitudinally displaced from the dam and is beyond the point where the upper portion 31 of the filter belt is tangent to the idler pulley 17. Thus, the mixture is fed to the upper portion of filter belt 30 beyond idler pulley 17 so that no fluid separation occurs in the region of pulley 17. The ends of the sheet metal spillway are bent upwardly to create sidewalls adjacent spillway 47 which limit the width of the layer of fluidized mixture to substantially the width of the filter belt. In FIG. 1, one of these sidewalls is marked 49 and in FIG. 2 the other is marked 50. Both appear in FIG. 3.

Figure 2:
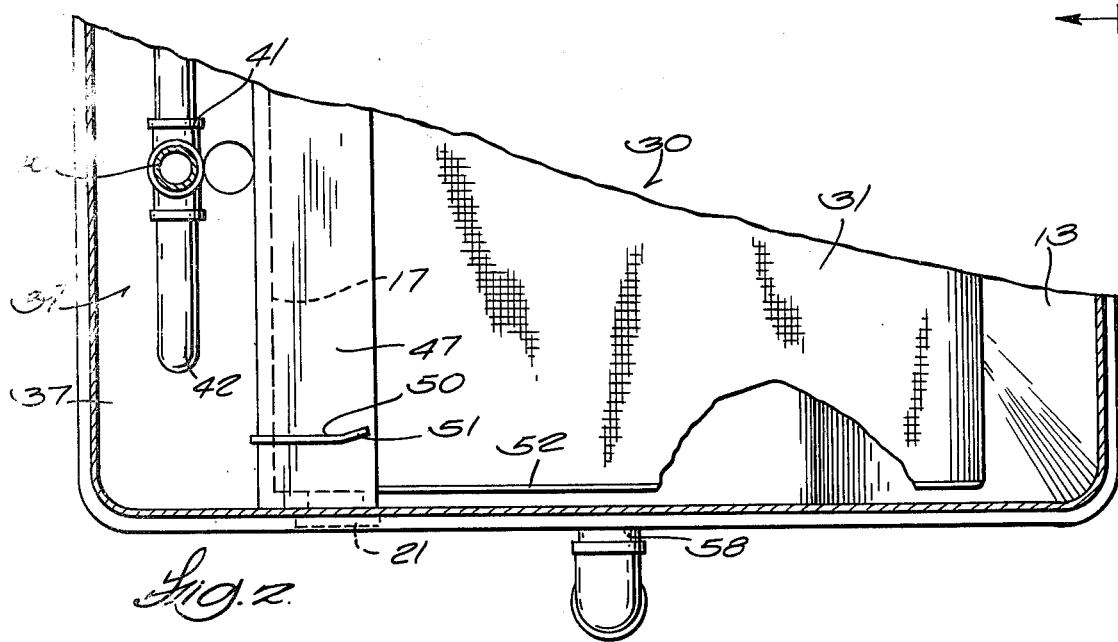
FIG. 2 is a fragmentary sectional view taken on a line corresponding with 2—2 in FIG. 1.

One may see in FIG. 2 that typical sidewall 50 has its leading edge 51 bent inwardly to cause the fluidized mixture flowing over the spillway to be converged slightly away from the edges of the filter belt.

As can be seen in FIG. 3, there are a pair of longitudinally extending members 52 and 53 which have a right angular cross section. The edges of the belt rest on the laterally extending parts of members 52 and 53 and the upwardly extending parts serve to prevent the mixture from spilling from the edges of the filter belt.

As can be seen in FIG. 1, there are a plurality of laterally extending rods 55 which support the upper filter belt portion 31 so it does not sag when loaded.

Fluid that filters or drains through upper belt portion 31 drops onto a pan 56 which is disposed between upper belt portion 31 and lower filter belt portion 32. As can be seen in FIG. 3, the pan has a slope which results in all of the collected fluid flowing off of its lower edge 57 so the fluid is not redeposited on lower filter belt run 32. This fluid drops into fluid collecting chamber 12.

As can be seen in FIG. 1, fluid collecting chamber 12 is v-shaped so the fluid tends to collect at its bottom. A short piece of pipe 58, see FIG. 3, leads from chamber 12 to a fitting 59. The fitting has an elbow part, a side outlet 61 or tee part and a bottom outlet 62. The bottom outlet 62 is connected by means of a pipe 63 to a Tee 64 that has a discharge outlet 65 which may lead to a waste collecting receptacle. Tee 64 is coupled to the solids collecting chamber 13 by means of suitable piping including pipe segments 66 and 67 and an elbow 68. Pipe section 67 is coupled to the converged lower end 69 of solids collecting chamber 13 with a coupling 70. The piping between Tee 64 and converged lower end 69 of the solids collecting chamber 13 is only in place when the separator is being operated in its cleaning mode. This pipe run is then used to drain away washing solution in which cleaning chemicals are dissolved. During normal operation of the separator, however, an outlet device, not shown, is coupled with coupling 70 so that the separated solids may be removed continuously and transported to any desired place. The opening in Tee 64, which would result from removal of pipe 66 during normal operation in the separating mode, is plugged by means, not shown, during such operation. Thus, the collected liquid may flow out of the opening 65 of Tee 64 during normal operation.

Another pipe assembly which is used only during operation in the cleaning mode is that which connects between Tee part 61 and an opening 71 in the bottom of well 37. This pipe run includes horizontal and vertical segments 72 and 73 and suitable fittings 74 for establishing continuity between Tee 61 and outlet 71 of the well. This run, comprised of pipe lengths 72 and 73, is in place during the cleaning mode, but is removed during normal operation and outlet 71 of the well and the tee part 61 or side branch of fitting 59 are capped when the apparatus is operating in its separating mode.

As can be seen particularly well in FIG. 1, the top 15 of the separator housing has a nozzle assembly 80 mounted to it. During the cleaning mode, the nozzle assembly has cleaning solvent delivered to it from a supply pipe 81 that is connected to a cleaning solvent delivery pump, not shown. The cleaning solvent is sprayed from the ends 82 and 83 of the nozzle assembly which have suitable orifices, not visible, for that purpose. Cleaning solvent which is sprayed from the nozzles bathes the interior components of the separator and flushes them off for drainage through the piping system which is connected to the bottom of well 37, fluid collecting chamber 12 and solids collecting chamber 13 as described above. Adjacent drain pan 56 and between upper and lower filter belt sections 31 and 32 there is another laterally extending pipe 84 which has orifices for projecting cleaning solvent. Although the means are not shown, this pipe is connected to the same cleaning solvent supply line that furnishes solvent to upper nozzle assembly 80 during operation in the cleaning mode. The porous belt, of course, is driven translationally during the cleaning mode to assure that the entire length and width of the belt is subjected to a flushing action.

When slurries of solid matter that have a tendency to conglomerate are being separated during transport along the filter belt, it may be necessary to scrape the solids from the filter belt. For this purpose, a scraper 85 mounted on a bracket 86 is shown schematically in FIG. 1.

To operate the apparatus in its normal separating mode, the fluidized mixture is delivered to well 37 at high velocity and high volume. The mixture is directed toward the bottom of the well and continuously undergoes turbulence. The mixture at the bottom is continuously being churned and displaced by further incoming liquid while the mixture at the top of the well flows over the dam 45 and spreads over the width of the sloped spillway 47. The mixture then spills downwardly onto the top portion 31 of the translating filter belt 30 and a thin layer of solids from which the fluid is being drained while in transport is formed on the belt. The belt is desirably driven at such speed that the layer of solids deposited on it will not be so thick as to eliminate all porosity. Thus, the solids themselves which form in small agglomerations contribute to liquid separation in a manner similar to the filter belt itself.

After a production run, the various openings at the bottom of the well 37 and bottom of the solid collection chamber 13 are coupled with the clean-in-place piping system and cleaning solvent is injected through the nozzle assembly 80 while the conveyor or filter belt is run. When the machine is cleaned in this manner, it is ready for another production run. The cover 15 of the separator is provided with inspection ports 87 and 88 which allows the interior of the housing to be observed during operation in either mode. The separator may be operated with cover 15 removed in cases where sanitary conditions do not necessarily have to be maintained.

I claim:

1. Apparatus for separating a mixture of liquids and solids comprising:

first and second spaced apart pulleys arranged with their axes or rotation in substantial parallelism, a closed loop filter belt of predetermined width and comprised of plastic filaments arranged to create a plurality of tortuous openings through the belt, said belt being for translating lengthwise on said pulleys and having upper and lower belt portions spanning between said pulleys, said upper belt portion running in a generally horizontal plane, means for rotating at least one of said pulleys to cause translation of said belt, a well adjacent said first pulley for receiving a fluidized solid and liquid mixture which is to be separated, said well having a bottom that is substantially below the level of said upper belt plane and a top opening which is above said plane, a planar member extending generally horizontally above and over said upper belt portion from said well opening and terminating beyond the line along the first pulley at which said upper belt portion makes its last tangential contact with said first pulley, said planar member being at a level for receiving only the overflow of said mixture from said well and for conducting said mixture on to said belt beyond said line of last tangential contact, and means for injecting said fluidized mixture into said well comprising a conduit disposed at the top of said well and extending in the lateral direction of said belt, said conduit having means intermediate its ends defining fluidized mixture inlet and said conduit having a plurality of nozzle means constituting outlets, said nozzle means being directed for discharging said mixture toward the bottom of said well for producing a turbulent stirring action therein.

2. The apparatus as in claim 1 including:

a housing for said apparatus, said housing having means defining first and second chambers each at levels below said belt for collecting fluid and solids, respectively, drain means disposed between said upper and lower belt portions for intercepting fluid which has filtered through said upper belt portion and for directing said fluid beyond an edge of said lower belt portion to said first chamber, said second chamber being under said second pulley for receiving solids delivered by said upper belt portion, drain conduit means having inlet and outlet means, said inlet means being coupled with said first chamber and said outlet means being for discharging fluid when said apparatus is operating in its filtering mode, means for communicating said well and said drain conduit means and means for communicating said second chamber and said conduit means only when said apparatus is to be operated in a cleaning mode, and means for introducing washing fluid into said housing during the cleaning mode.

* * * * *